(12) United States Patent
Kim et al.

(10) Patent No.: US 6,906,768 B1
(45) Date of Patent: Jun. 14, 2005

(54) MULTI-DOMAIN LIQUID CRYSTAL DISPLAY DEVICE WITH PARTICULAR DIELECTRIC STRUCTURES

(75) Inventors: Kyeong Jin Kim, Bucheon-shi (KR); Yun Bok Lee, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/604,796

(22) Filed: Jun. 27, 2000

Related U.S. Application Data

(63) Continuation-in-part of application No. 09/448,276, filed on Nov. 24, 1999.

(30) Foreign Application Priority Data

Jan. 14, 2000 (KR) .......................................... 2000-1793

(51) Int. Cl.[7] ............................................. G02F 1/1337
(52) U.S. Cl. .......................................... 349/129; 349/84
(58) Field of Search ........................... 349/129, 84, 191

(56) References Cited

U.S. PATENT DOCUMENTS

| | | | |
|---|---|---|---|
| 5,309,264 A | 5/1994 | Lien et al. | |
| 5,510,916 A | 4/1996 | Takahashi | |
| 5,673,092 A | 9/1997 | Horie et al. | |
| 5,699,139 A | 12/1997 | Aastuen et al. | |
| 5,726,728 A | * 3/1998 | Kondo et al. | 349/156 |
| 5,844,643 A | * 12/1998 | Onishi et al. | 349/93 |
| 6,061,117 A | * 5/2000 | Horie et al. | 349/156 |
| 6,256,080 B1 | * 7/2001 | Colgan et al. | 349/129 |
| 6,304,308 B1 | * 10/2001 | Saito et al. | 349/155 |
| 6,344,883 B2 | * 2/2002 | Yamada et al. | 349/32 |
| 6,356,335 B1 | 3/2002 | Kim et al. | |
| 6,473,142 B2 | 10/2002 | Kim et al. | |
| 6,525,794 B1 | 2/2003 | Kim et al. | |

FOREIGN PATENT DOCUMENTS

| | | |
|---|---|---|
| DE | 19950366 A1 | 5/2000 |
| EP | 0884626 | 12/1998 |
| EP | 1030211 | 8/2000 |
| EP | 1103840 A2 | 5/2001 |
| EP | 1111441 A2 | 6/2001 |
| EP | 1113311 A2 | 7/2001 |
| EP | 1113311 A3 | 1/2002 |
| GB | 2343012 | 4/2000 |
| GB | 2343012 A | 4/2000 |
| GB | 2347779 | 9/2000 |
| GB | 2358576 A | 8/2001 |
| JP | 8292423 | 11/1996 |
| JP | 11242225 | 9/1999 |
| JP | 11-258605 | 9/1999 |
| JP | 2000075275 | 3/2000 |
| JP | 2000305086 | 8/2000 |
| WO | WO 00/08521 | 2/2000 |

OTHER PUBLICATIONS

V. A. Konovalov, et al., "Multi–Domain Vertically Aligned Mode", 1998 SID International Symposium Digest of Technical Papers, 4 pages.

Preliminary Search Report dated Jun. 3, 2004 by the French Patent Office.

* cited by examiner

*Primary Examiner*—Tarifur R. Chowdhury
*Assistant Examiner*—Timothy Rude
(74) *Attorney, Agent, or Firm*—McKenna Long & Aldridge LLP

(57) ABSTRACT

The present multi-domain liquid crystal display device includes first and second substrates facing each other; a liquid crystal layer between the first and second substrates; a first dielectric frame on one side of the pixel region; a second dielectric frame on another side of the pixel region; and a third dielectric frame between the first dielectric frame and the second dielectric frame.

37 Claims, 10 Drawing Sheets

MULTI-DOMAIN LIQUID CRYSTAL DISPLAY DEVICE WITH PARTICULAR DIELECTRIC STRUCTURES

CROSS REFERENCE TO RELATED APPLICATIONS

The application is a Continuation-in-Part of U.S. patent application Ser. No. 09/448,276 filed on Nov. 24, 1999 and this application also claims the benefit of Korean Patent Application No. 2000-1793, filed on Jan. 14, 2000, which are hereby incorporated by reference for all purposes as if fully set forth herein.

BACKGROUND OF THE INVENTION

1. Field of the Invention

The present invention relates to a liquid crystal display device (LCD), and more particularly, to a multi-domain liquid crystal display device having a dielectric frame in or around divided pixel region, and having a special dielectric frame on the center of the divided pixel region.

2. Description of the Related Art

Recently, a LCD has been proposed where the liquid crystal is not aligned, and the liquid crystal is driven by side electrodes insulated from pixel electrodes. FIG. 1 is a sectional view of pixel unit of the conventional LCDs.

Regarding conventional LCDS, first and second substrates, a plurality of gate bus lines arranged in a first direction on a first substrate and a plurality of data bus lines arranged in a second direction on the first substrate divide the first substrate into a plurality of pixel regions.

The TFT is formed on each pixel region on the first substrate and comprises a gate electrode, a gate insulator, a semiconductor layer, a ohmic contact layer, a source electrode, a drain electrode, etc.

The passivation layer 37 is preferably formed over the whole first substrate.

The pixel electrode 13 is coupled to the drain electrode on the passivation layer 37.

Side electrode 21 is overlapped with a part of pixel electrode 13 on the gate insulator.

On the second substrate, a light shielding layer 25 is formed shielding light leakage from the gate bus line, data bus line, and TFT. A color filter layer 23 is on light shielding layer 25. A common electrode 17 is on color filter, layer 23. And a liquid crystal layer is between the first and second substrates.

The side electrode 21 formed around the pixel electrode 13 and an open area 27 of the common electrode 17 distort the electric field applied to the liquid crystal layer. Then, in a unit pixel, liquid crystal molecules are variously driven. This means that when voltage is applied to the LCD, dielectric energy due to the distorted electric field arranges the liquid crystal directors in a needed or desired position.

However, to obtain a multi-domain effect, open area 27 in common electrode 17 is necessary, which requires patterning of the common electrode 17. Moreover, if the electrodes do not have an open area or the open area is narrow, the distortion of electric field needed to divide the pixel region becomes weak. Then, the time needed the liquid crystal directors to become stable increases. Further, according to the division of the domain due to the open area 27, the liquid crystal texture has an irregular structure. As a result, the quality of display is deteriorated. Also, the brightness and the response time increase because a strong electric field is formed between the pixel electrode 13 and the side electrode 21.

SUMMARY OF THE INVENTION

Accordingly, the present invention is directed to a liquid crystal display device that substantially obviates one or more problems due to limitations and disadvantages of the related art.

An object of the present invention is to provide a multi-domain LCD that has a dielectric frame in or around a divided pixel region, and has a special dielectric frame formed for maintaining an island-shape or a cell gap on the center of the divided pixel region. As a result, the stability of the texture in a screen display, the improvement of transmission and the multi-domain effect can be realized.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates having pixel regions; a liquid crystal layer between the first and second substrates; a first dielectric frame formed in one side of the pixel region; a second dielectric frame formed in another side of the pixel region; and a third dielectric frame-between the first and second dielectric frames.

A multi-domain liquid crystal display device, as another embodiment of the present invention, comprises first and second substrates having pixel regions divided to a plurality of regions; a liquid crystal layer between the first and second substrates; a first dielectric frame formed on one side of the pixel region, within the divided each pixel region; a second dielectric frame formed on another side of the pixel region, within the divided each pixel region; and a third dielectric frame between the first and second dielectric frames.

The third dielectric frame maintains uniformly cell gap between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE INVENTION

Hereinafter, the multi-domain liquid crystal display device of the present invention is explained in detail by accompanying the drawings.

Figure 1:
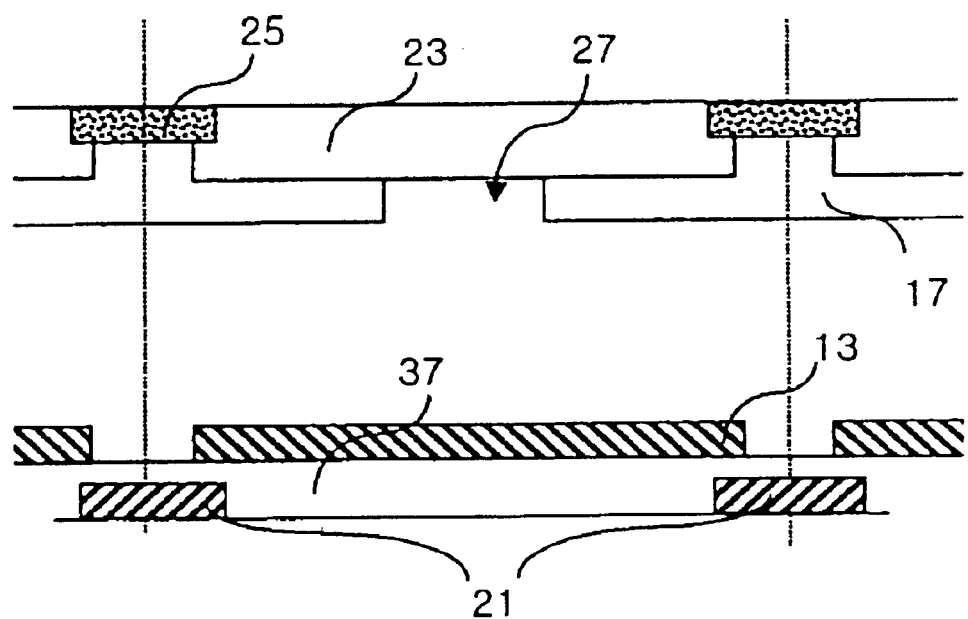
FIG. 1 is a sectional view of the liquid crystal display device in the related art.
Figure 2A:
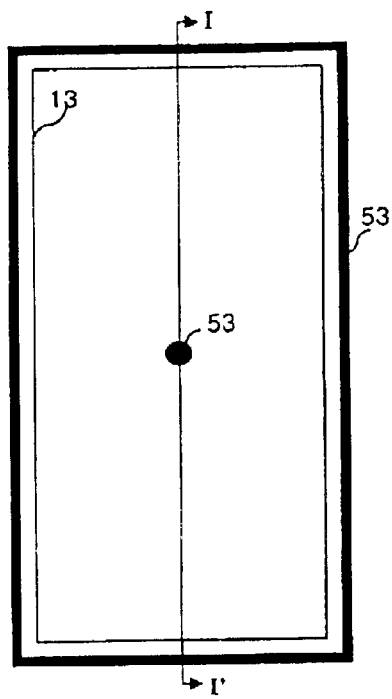
FIGS. 2A, 2B, 2C, and 2D are plane views of the multi-domain liquid crystal display devices according to the first embodiment of the present invention.
Figure 2B:
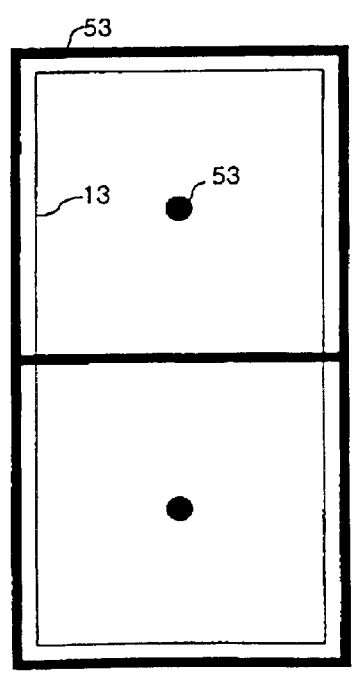
Figure 2C:
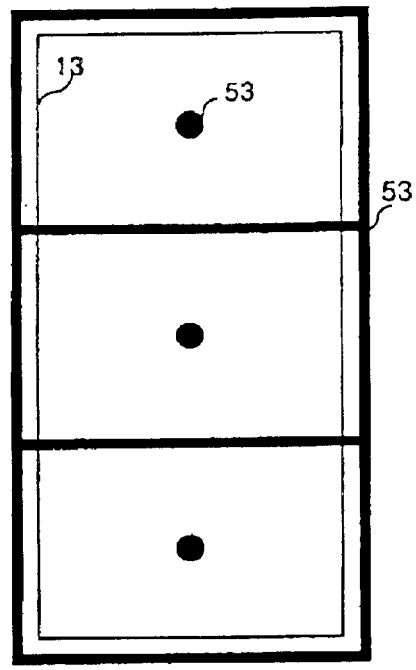
Figure 2D:
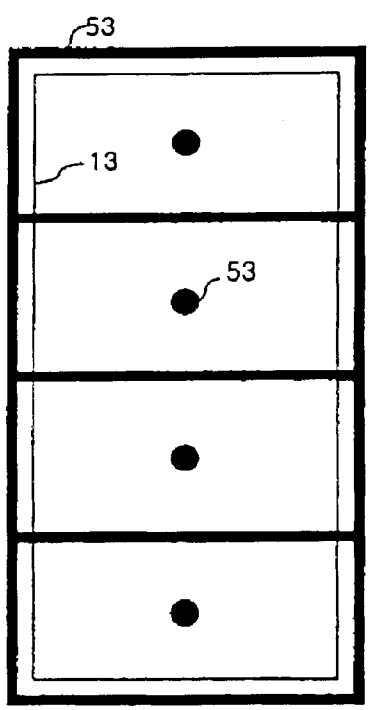
Figure 3A:
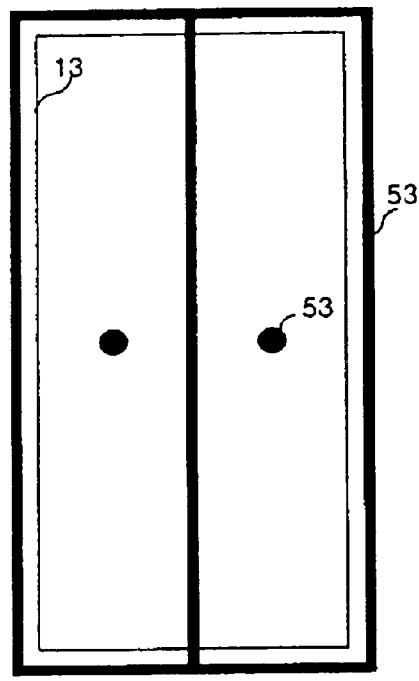
FIGS. 3A, 3B, 3C and 3D are plane views of the multi-domain liquid crystal display devices according to the second embodiment of the present invention.
Figure 3B:
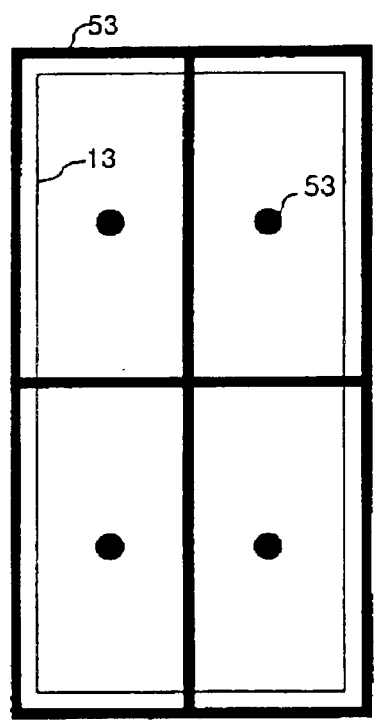
Figure 3C:
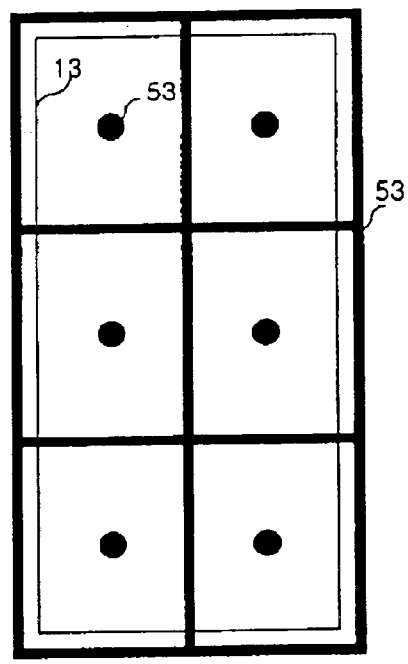
Figure 3D:
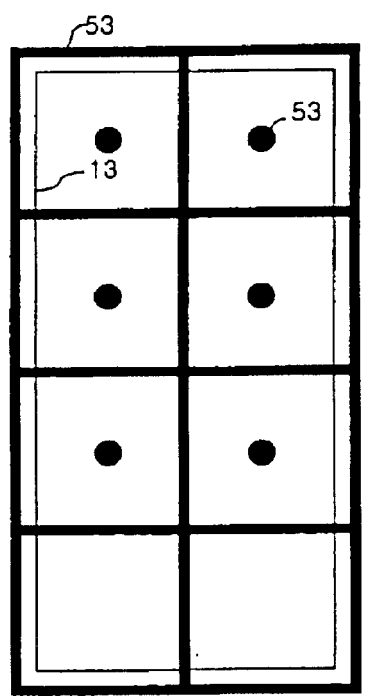

FIGS. 2A to 2D are plane views of the multi-domain liquid crystal display devices according to the first embodiment of the present invention, FIGS. 3A to 3D are plane views of the multi-domain liquid crystal display devices according to the second embodiment of the present invention, and FIGS. 4A, 4B, 4C, 5A, 5B and 5C are sectional views of the multi-domain liquid crystal display devices according to line I–I' of FIG. 2A in the present invention.

As shown in the above figures, the multi-domain liquid crystal display device according to the present invention comprises first and second substrates 31, 33, a plurality of gate and data bus lines 1, arranged in the perpendicular and horizontal directions on the first substrate to divide the first substrate into a plurality of pixel regions.

The TFT is formed on each pixel region on the first substrate 31 and comprises a gate electrode 11, a gate insulator 35, a semiconductor layer, a ohmic contact layer, a source electrode, a drain electrode, etc.

A passivation layer 37 is preferably formed over the whole first substrate 31.

A pixel electrode 13 is connected to the drain electrode 9 on the passivation layer 37.

And, on the second substrate 33, a light shielding layer 25 is formed to shield light leakage from the gate bus line 1, data bus line, and TFT. A color filter layer 23 is on light shielding layer 25. A common electrode 17 is on color filter layer 23. And a liquid crystal layer is between the first an second substrates 31 and 33.

A dielectric frame 53 is formed so as to enclose the pixel region on the first and second substrates 31, 33, also may be formed in the pixel region so as to divide into a plurality of domains. Further island-shaped dielectric frame is specially formed on the center of the pixel region or on the center of the each domain, so that the dielectric frame functions as a single point enabling the stability of the composition of a picture and uniform screen display. The dielectric frame 53 formed around the pixel region can prevent deterioration of transmission generated by the conventional side electrode and enable to reduce the process.

In other words, the dielectric frame 53 variously distorts an electric field provided on the liquid crystal layer, so that the stability of the liquid crystal display device and the multi-domain effect can be realized. Also, in the case that the dielectric frame 53 is highly formed for maintaining cell gap, it plays a role of the spacer of a liquid crystal display device, as shown in the FIGS. 4B, 4C, 5B and 5C.

To manufacture the LCD, in each pixel region on the first substrate 31, a TFT is formed comprising a gate electrode, a gate insulator 35, a semiconductor layer, an ohmic contact layer and source/drain electrodes. At this time, a plurality of gate bus lines 1 and a plurality of data bus lines are formed to divide the first substrate 31 into a plurality of pixel regions.

The gate electrode and the gate bus line 1 are formed by sputtering and patterning a metal such as Al, Mo, Cr, Ta, or Al alloy, the combination of the metals etc. The gate insulator 35 is formed by depositing $SiN_x$ or $SiO_x$ using PECVD (Plasma Enhancement Chemical Vapor Deposition) thereon.

The semiconductor layer 5 and the ohmic contact layer are formed by depositing the PECVD, and patterning amorphous silicon (a-Si) and doped amorphous silicon ($N^+$a-Si), respectively. Also, the gate insulator 35 can be formed by depositing SiNx, SiOx, a-Si and $n^+$ a-Si continuously, and then the semiconductor layer and the ohmic contact layer can be formed by patterning a-Si and n+a-Si. Further the gate insulator 35 can be formed with BCB (BenzoCycloButene), acrylic resin or polyimide based material so as to improve aperture ratio.

The data bus line and source/drain electrodes are formed by sputtering and patterning a metal such as Al, Mo, Cr, Ta, or Al alloy etc. At this time, a storage electrode is formed to overlap the gate bus line 1 at the same time, the storage electrode makes a storage capacitor with gate bus line 1.

Subsequently, a passivation layer 37 is formed with BCB (BenzoCycloButene), acrylic resin, polyimide based material, $SiN_x$ or $SiO_x$ on the whole first substrate 31. And the pixel electrode 13 is formed by sputtering and patterning a metal such as ITO (indium tin oxide). A contact hole (not shown in figures) is formed to connect the pixel electrode 13 to the drain 9 and storage electrodes One the second substrate 33, a light shielding layer 25 is formed to shield any light leakage from gate and data bus lines 1, and the TFT. A color filter layer 23 is formed R, G, B, (red, green blue) elements which are repeated. A common electrode 17 is formed with ITO on the color filter layer 23 as the pixel electrode 13, and a dielectric frame 53 is formed by deposition photosensitive material in a region other than a region where the pixel electrode 13 is formed and patterning in various shapes using photolithography.

And a liquid crystal layer is formed by injecting liquid crystal between the first and second substrates. The liquid crystal layer may include liquid crystal molecules having positive or negative dielectric anisotropy. Also, the liquid crystal layer may include chirals dopants.

A dielectric frame 53 is formed around and in the pixel region so as to divide into a plurality of domains, and island-shaped dielectric frame is additionally formed on the center of each domain. Also in the case of expanding from the first and second substrates to a facing substrate, the dielectric frame can play a role of the spacer maintaining cell gap between the first and second substrates. Further the dielectric frame 53 is formed by executing exposure of once with transmission/semi-transmission mask or a diffraction mask.

The dielectric frame 53 includes material of which dielectric constant is same or smaller than of the liquid crystal, and the dielectric constant thereof is preferably below 3, for example, photoacrylate, BCB or black resin. When the black resin is used, resin black matrix is formed so that a special light shielding layer 25 is not needed. Also a light-shielding layer formed on boundary of a domain for preventing light leakage need not be used.

Additionally on at least one substrate, a compensation film 29 is formed with polymer.

The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, a polarizer (not shown in figures) is formed on at least one substrate. At this time, the compensation film and the polarizer are preferably composed as one.

A multi-domain liquid crystal display device shown in FIGS. 2A, 2B, 2C and 2D has a dielectric frame 53 around and within a pixel region, so that the pixel region is vertically divided into two domains, three domains and four domains. An island-shaped dielectric frame that is independently formed on the center of each domain and the pixel region plays a role of the single point of a screen display.

A multi-domain liquid crystal display device shown in FIGS. 3A, 3B, 3C and 3D has a dielectric frame 53 around and within a pixel region, so that the pixel region is divided into two domains, four domains, six domains and eight domains, horizontally and vertically. An island-shaped dielectric frame that is independently formed on the center of each domain and the pixel region plays a role of the single point of a screen display.

Figure 4A:
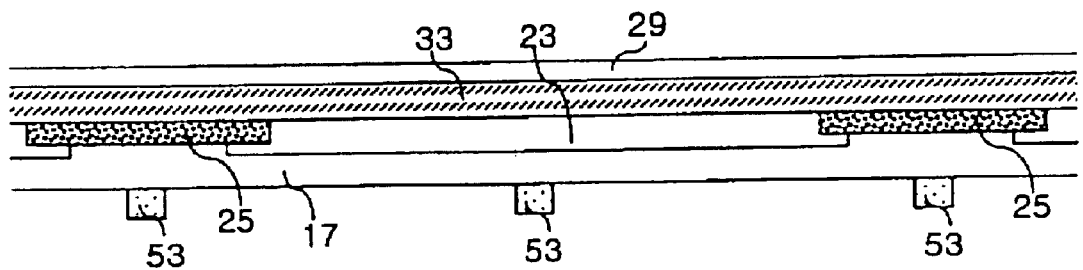
FIGS. 4A, 4B and 4C are sectional views of the multi-domain liquid crystal display devices according to line I–I' of FIG. 2A in the present invention.
Figure 4B:
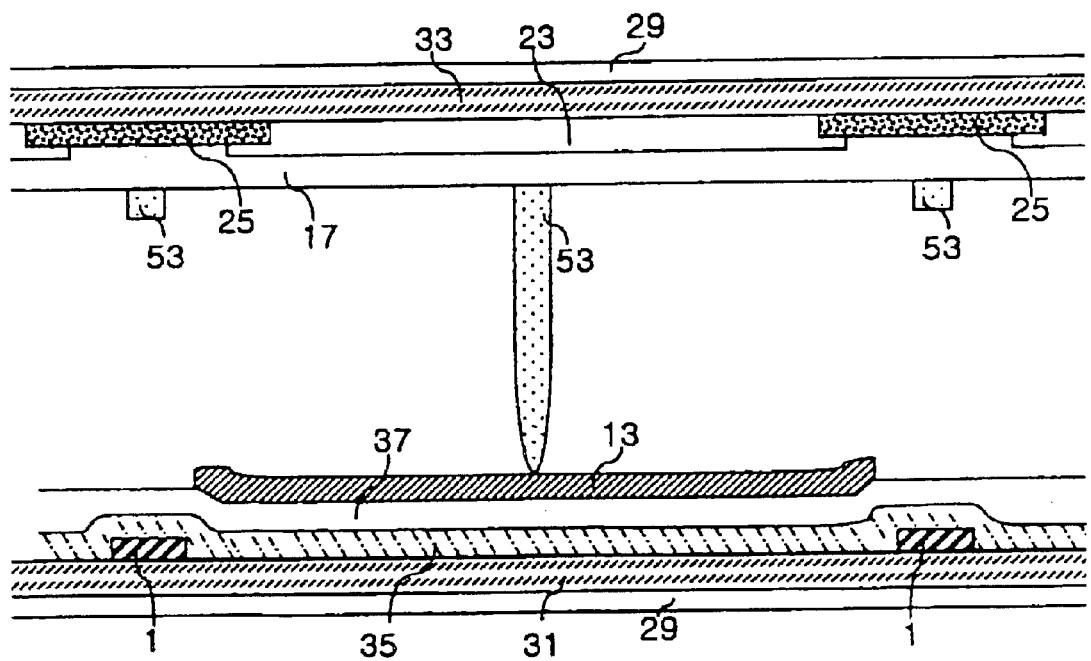
Figure 4C:
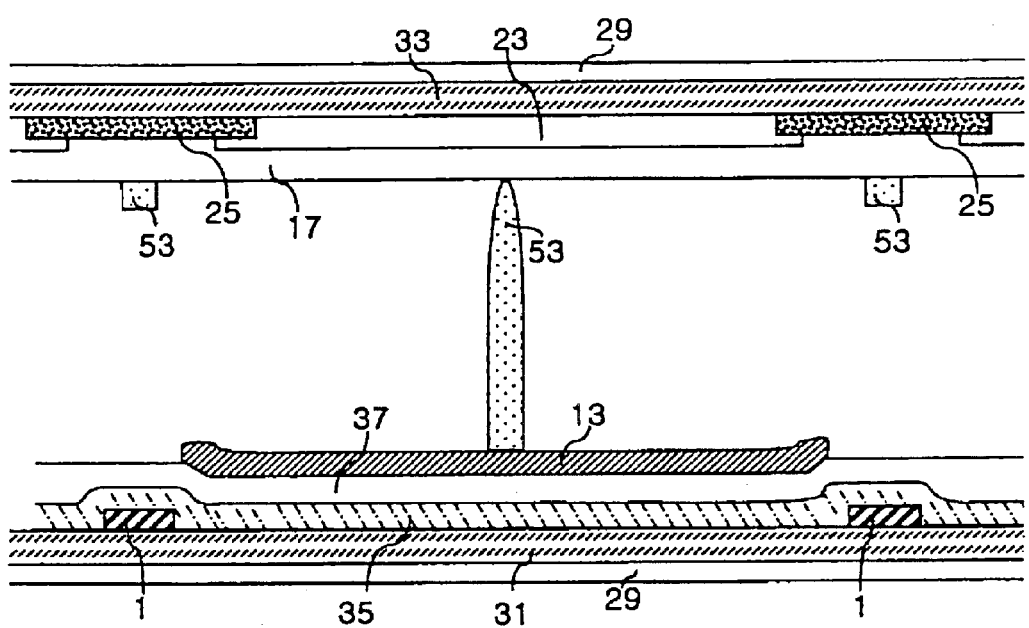

In FIG. 4A, the dielectric frame 53 is formed as a low projection-shape on the second substrate 33, and in FIG. 4B, the dielectric frame 53 is expanded from the second substrate to the first substrate 31 for maintaining cell gap of a liquid crystal display device. In FIG. 4C, the dielectric frame 53 is expanded from the first substrate 31 to the second substrate 33 for maintaining cell gap of a liquid crystal display device.

Figure 5A:
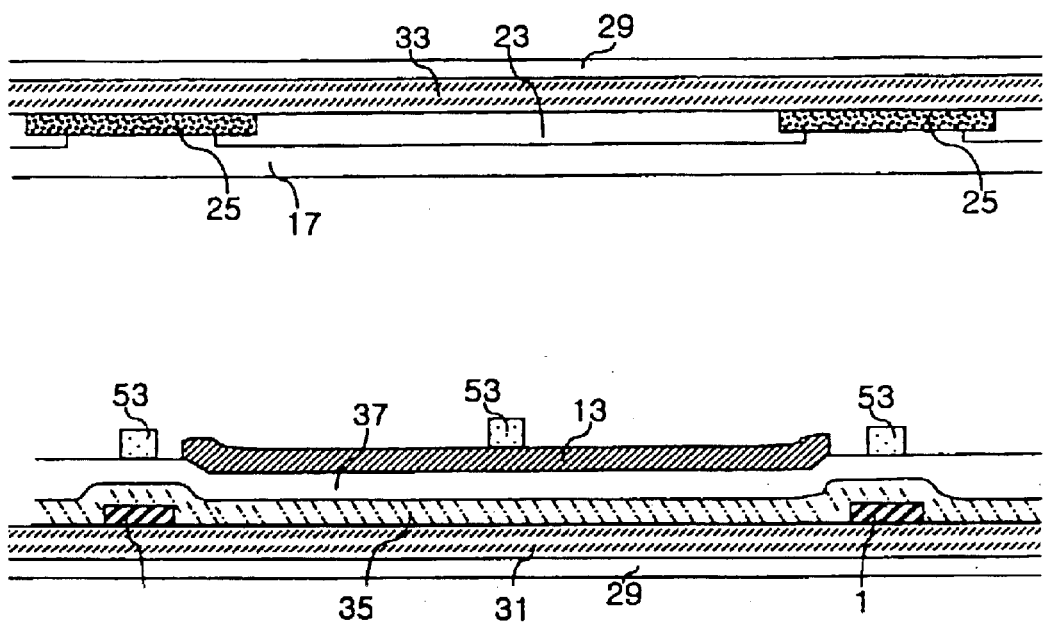
FIGS. 5A, 5B and 5C are sectional views of the multi-domain liquid crystal display devices according to line I–I' of FIG. 2A in the present invention.
Figure 5B:
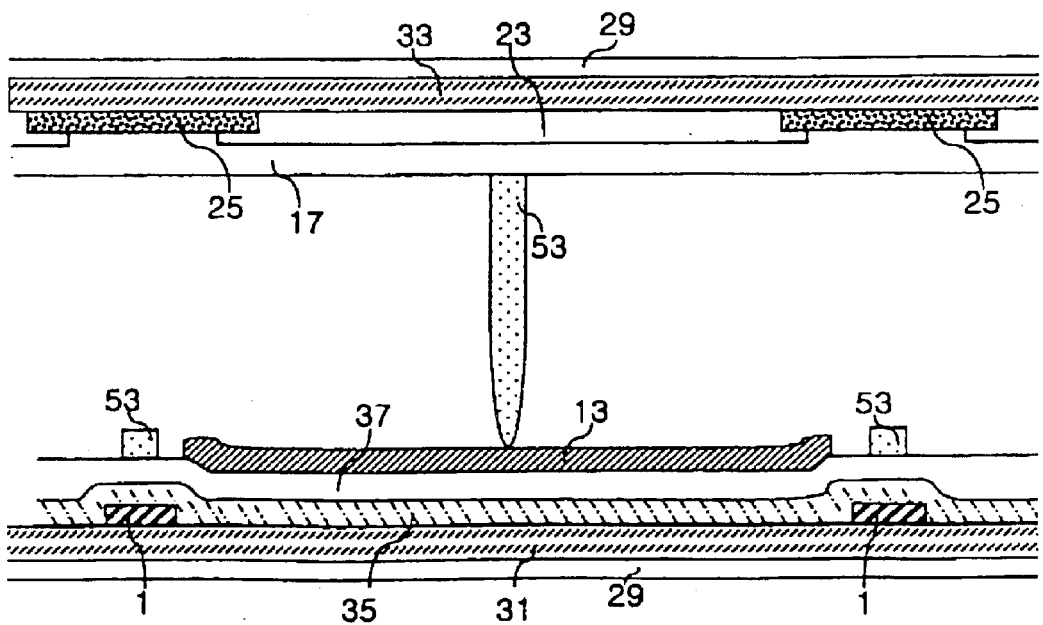
Figure 5C:
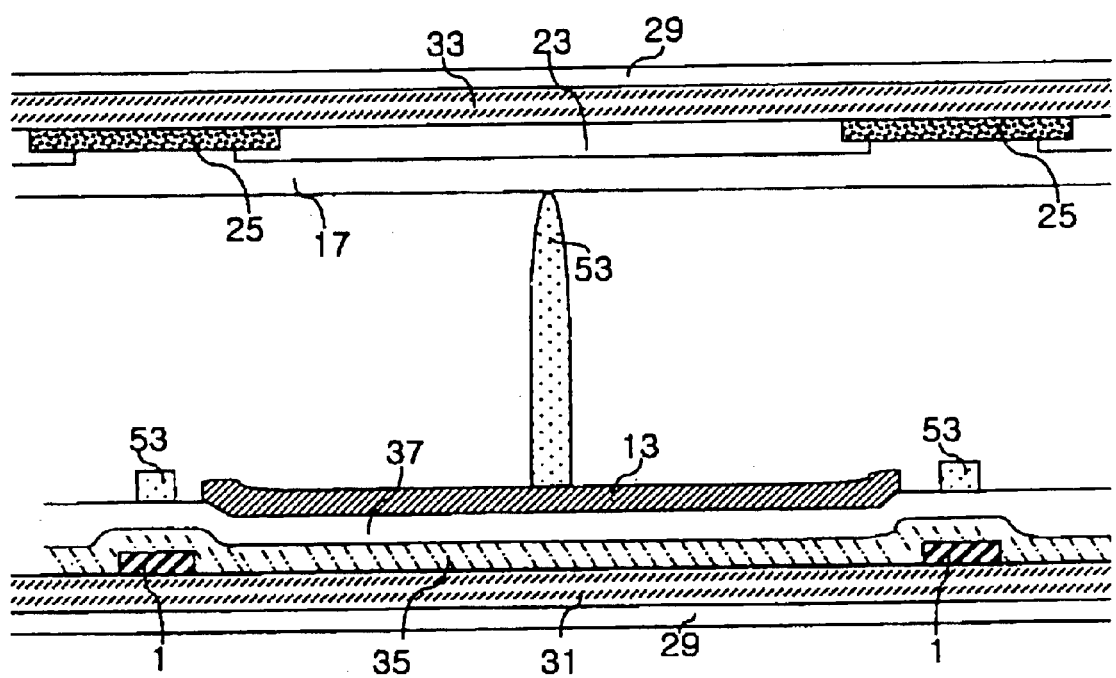

In FIG. 5A, the dielectric frame 53 is formed as a low projection-shape on the second substrate 33, and in FIG. 5B, the dielectric frame 53 is expanded from the second substrate 33 to the first substrate 31 for maintaining cell gap of a liquid crystal display device. In FIG. 5C, the dielectric frame 53 is expanded from the first substrate 31 to the second substrate 33 for maintaining cell gap of a liquid crystal display device.

Figure 6A:
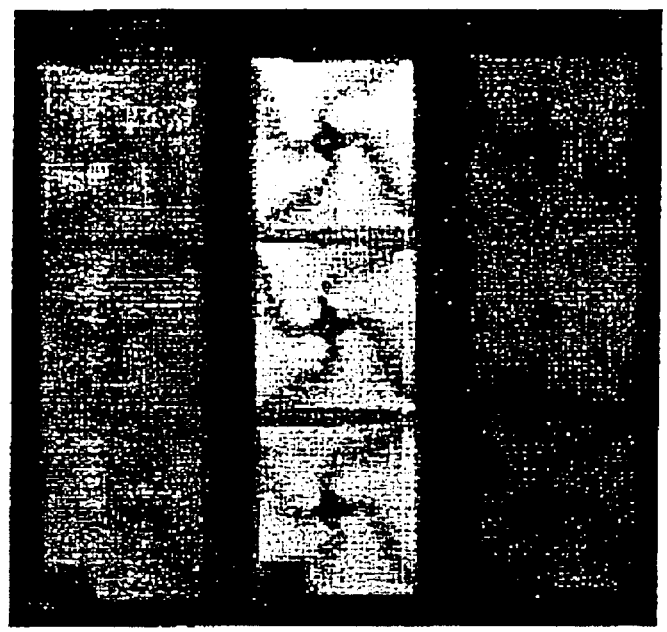
FIGS. 6A and 6B are views showing the texture, when the multi-domain liquid crystal display devices according to the present invention and the. related art are driven respectively.
Figure 6B:
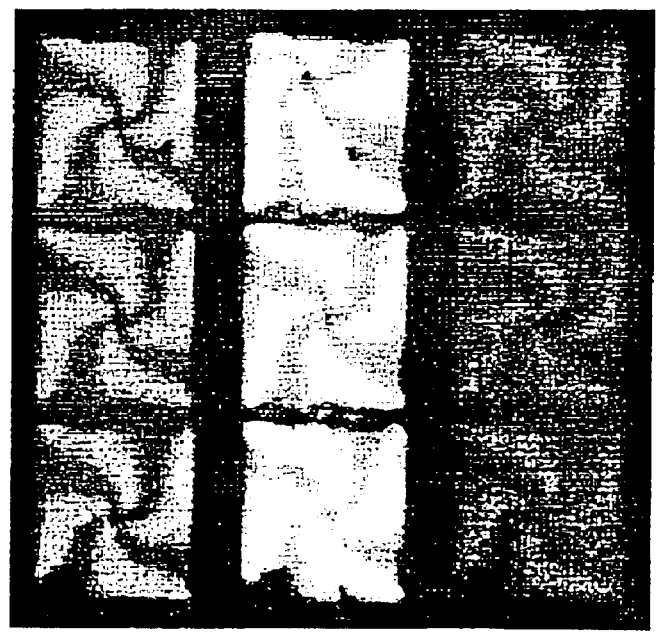

FIGS. 6A and 6B are views showing the texture, when multi-domain liquid crystal display devices according to the present invention and the related art are respectively driven in the middle gray.

FIG. 6A is a view showing the texture, when multi-domain a liquid crystal display device according to the present invention is driven. A dielectric frame in a pixel region controls an applied electric field, so that uniform texture is formed on each domain. In the other hand, FIG. 6B is a view showing the texture, when multi-domain liquid crystal display devices according to the related art is driven. The different and irregular textures are formed on each domain, so that deteriorate screen display is found.

Additionally, in multi-domain LCD of the present invention, an alignment layer (not shown in the figure) in formed over the whole first and/or second substrates. The alignment includes a photosensitive material such as PVCN (polyvinylcinnamate), PSCN (polysiloxanecinnamate), and CelCN (cellulosecinnamate) based materials. Any material suitable for the photo-alignment treatment may be used.

Irradiating light at least once on the alignment layer determines an alignment direction or a pretilt direction and a pretilt angle at the same time, so that the stability of liquid crystal molecules is obtained. The light used in the photo-alignment is preferably a light in a range of ultraviolet light, and any of unpolarized light, linearly polarized light, and partially polarized light can be used.

In the rubbing or photo-alignment treatment, it is possible to apply one or both of the first and second substrates, and to apply different alignment-treatment on each substrate.

From the alignment-treatment, a multi-domain LCD is formed with at least two domains, and LC molecules of the LC layer are aligned differently one another on each domain.

That is, the multi-domain is obtained by dividing each a pixel into four domains such as in a "+" or "×" shape, or dividing each pixel horizontally, vertically, and/or diagonally, and differently alignment-treating or forming alignment directions on each domain and on each substrate, so that multi-domain effect is obtained. It is possible to have at least one domain of the divided domains unaligned. It is also possible to have all domains unaligned.

Consequently, since the multi-domain LCD of the present invention forms the dielectric frame around and in divided pixel region, and the special dielectric frame is formed on the center of each pixel region as the island-shape, for maintaining cell gap. As a result, the control of alignment direction is easy, the stability of the texture is realized on the screen display, and wider viewing-angle and multi-domain effect is obtained by electric field distortion.

Also, the present invention needs not to form a side electrode like the related art, so that transmission is improved.

It will be apparent to those skilled in the art that various modifications can be made in the multi-domain liquid crystal display device and method of manufacturing of the present invention without departing from the sprit or scope of the invention. Thus, it is intended that the present invention covers the modifications and variations of this invention provided they come within the scope of the appended claims and their equivalents.

What is claimed is:

1. The multi-domain liquid crystal display device comprising:
   first and second substrates facing each other and having a pixel region;
   a liquid crystal layer between the first and second substrates;
   a first dielectric frame on one side of the pixel region;
   a second dielectric frame on another side of the pixel region; and
   a dielectric extending from the first substrate to the second substrate between the first dielectric frame and the second dielectric frame;
   wherein the first and second dielectric frames are located exclusively in regions other than where the pixel region is formed,
   wherein the first and second dielectric frames distort electric field applied to the liquid crystal layer.

2. The multi-domain liquid crystal display device according to claim 1, wherein the dielectric protrusion acts as a spacer to establish a cell gap of the liquid crystal display device.

3. The multi-domain liquid crystal display device according to claim 2, wherein the dielectric protrusion is expanded from the first substrate to the second substrate.

4. The multi-domain liquid crystal display device according to claim 2, wherein the dielectric protrusion is expanded from the second substrate to the first substrate.

5. The multi-domain liquid crystal display device according to claim 1, wherein the height of the dielectric protrusion is equal to that of the first dielectric frame.

6. The multi-domain liquid crystal display device according to claim 1, wherein the height of the dielectric protrusion is equal to that of the second dielectric frame.

7. The multi-domain liquid crystal display device according to claim 1, wherein the height of the dielectric protrusion is higher than that of the first and second dielectric frames.

8. The multi-domain liquid crystal display device according to claim 1, wherein said first and second dielectric frames surround at least three sides of the pixel region.

9. The multi-domain liquid crystal display device comprising:

first and second substrates facing each other and having a pixel that is divided into a plurality of regions;

a liquid crystal layer between the first and second substrates;

a first dielectric protrusion on one side of a first one of the divided pixel regions;

a second dielectric protrusion on another side of the first one of the divided pixel regions; and a third dielectric protrusion between the first dielectric protrusion and the second dielectric protrusion, wherein the third dielectric protrusion extends from the first substrate to the second substrate;

wherein the first and second dielectric protrusions are located exclusively in regions other than where the divided pixel regions are formed, wherein at least one of the first, second and third dielectric protrusions distort electric field applied to the liquid crystal layer.

10. The multi-domain liquid crystal display device according to claim 9, wherein the third dielectric protrusion acts as a spacer to maintain a cell gap of the liquid crystal display device.

11. The multi-domain liquid crystal display device according to claim 9, wherein the third dielectric protrusion is located at a central portion of each divided pixel region.

12. The multi-domain liquid crystal display device according to claim 9, wherein the first and second dielectric protrusions surround the first one of the divided pixel regions.

13. The multi-domain liquid crystal display device according to claim 9, wherein each of the divided pixel regions has a different driving property from each other.

14. The multi-domain liquid crystal display device according to claim 9, further comprising:

a fourth dielectric protrusion on one side of a second one of the divided pixel regions;

a fifth dielectric protrusion on another side of the second one of the divided pixel regions; and a sixth dielectric protrusion between the fourth dielectric protrusion and the fifth dielectric protrusion.

15. The multi-domain liquid crystal display device according to claim 9, wherein the divided pixel regions include two regions.

16. The multi-domain liquid crystal display device according to claim 9, wherein the divided pixel regions include at least three regions.

17. The multi-domain liquid crystal display device according to claim 9, wherein the divided pixel regions include at least four regions.

18. The multi-domain liquid crystal display device according to claim 9, wherein the divided pixel regions include at least six regions.

19. The multi-domain liquid crystal display device according to claim 9, wherein the divided pixel regions include eight regions.

20. A multi-domain liquid crystal display device having an array of pixels comprising:

a first substrate;

a second substrate;

a liquid crystal layer between the first and second substrates;

a first insulating protrusion over the first substrate corresponding to a first side of one of a pixel;

a second insulating protrusion over the first substrate corresponding to a second side of the pixel; and a third insulating protrusion between the first and second insulating protrusions and acting as a spacer extending from the first substrate to the second substrate, wherein the first and second insulating protrusions are located exclusively in regions other than where the pixel is formed.

21. The multi-domain liquid crystal display device according to claim 20, wherein the pixel is divided into at least two regions.

22. The multi-domain liquid crystal display device according to claim 20, wherein the pixel is divided into at least three regions.

23. The multi-domain liquid crystal display device according to claim 20, wherein the pixel is divided into at least four regions.

24. The multi-domain liquid crystal display device according to claim 20, wherein the pixel is divided into at least six regions.

25. The multi-domain liquid crystal display device according to claim 20, wherein the pixel is divided into at least eight regions.

26. The multi-domain liquid crystal display device according to claim 20, wherein the third insulating protrusion extends from the first substrate to the second substrate.

27. The multi-domain liquid crystal display device according to claim 20, wherein the third insulating protrusion extends from the second substrate to the first substrate.

28. The multi-domain liquid crystal display device according to claim 20, wherein the first substrate is an upper substrate.

29. The multi-domain liquid crystal display device according to claim 20, wherein the first substrate is a lower substrate.

30. The multi-domain liquid crystal display device according to claim 20, wherein the third insulating protrusion has a thickness substantially same as a thickness of the first insulating protrusion.

31. The multi-domain liquid crystal display device according to claim 30, wherein a thickness of a third insulating protrusion is substantially same as a thickness of the second insulating protrusion.

32. The multi-domain liquid crystal display device according to claim 20, wherein the third insulating protrusion has a height substantially same as a height of the first insulating protrusion.

33. The multi-domain liquid crystal display device according to claim 32, wherein a height of the third insulating protrusion is substantially same as a height of the second insulating protrusion.

34. The multi-domain liquid crystal display device according to claim 20, wherein each of the pixels is divided into multiple sections to form a multi-domain pixel.

35. The multi-domain liquid crystal display device according to claim 34, wherein the third insulating protru sion surrounds a periphery of each of the multiple sections of the pixel.

36. The multi-domain liquid crystal display device according to claim 34, wherein the third insulating protrusion is located at a central portion of each of the multiple sections of the pixel.

37. The multi-domain liquid crystal display device according to claim 20, wherein the third insulating protrusion is spaced from the first and second protrusions by a substantially same distance.

* * * * *